US008310521B2

(12) United States Patent
Zhang et al.

(10) Patent No.: US 8,310,521 B2
(45) Date of Patent: Nov. 13, 2012

(54) INSERTION OF VIRTUAL VIDEO INTO LIVE VIDEO

(75) Inventors: Zhengyou Zhang, Bellevue, WA (US); Aaron Bobick, Alpharetta, GA (US)

(73) Assignee: Microsoft Corp., Redmond, WA (US)

( * ) Notice: Subject to any disclaimer, the term of this patent is extended or adjusted under 35 U.S.C. 154(b) by 1416 days.

(21) Appl. No.: 11/742,504

(22) Filed: Apr. 30, 2007

(65) Prior Publication Data

US 2008/0267578 A1  Oct. 30, 2008

(51) Int. Cl.
H04N 7/14 (2006.01)
(52) U.S. Cl. ............... 348/14.15; 348/14.08; 348/14.11; 370/259; 709/201; 709/232
(58) Field of Classification Search .... 348/14.01–14.16; 370/259–271, 351–356; 709/201–207, 217–248
See application file for complete search history.

(56) References Cited

U.S. PATENT DOCUMENTS

| | | | |
|---|---|---|---|
| 5,963,246 A | 10/1999 | Kato | |
| 6,288,739 B1 * | 9/2001 | Hales et al. | 348/14.07 |
| 6,404,747 B1 | 6/2002 | Berry et al. | |
| 6,496,201 B1 | 12/2002 | Baldwin et al. | |
| 6,600,491 B1 * | 7/2003 | Szeliski et al. | 345/473 |
| 6,636,220 B1 | 10/2003 | Szeliski et al. | |
| 6,959,322 B2 * | 10/2005 | Ludwig et al. | 709/204 |
| 7,061,521 B2 * | 6/2006 | Bulriss et al. | 348/14.08 |
| 7,085,243 B2 | 8/2006 | Decker et al. | |
| 7,164,435 B2 | 1/2007 | Wang et al. | |
| 7,227,567 B1 * | 6/2007 | Beck et al. | 348/14.07 |
| 2002/0038293 A1 | 3/2002 | Seiden | |
| 2005/0185045 A1 | 8/2005 | Kamariotis | |
| 2006/0132595 A1 | 6/2006 | Kenoyer et al. | |
| 2007/0133437 A1 * | 6/2007 | Wengrovitz et al. | 370/260 |
| 2007/0263824 A1 * | 11/2007 | Bangalore et al. | 379/202.01 |
| 2008/0136895 A1 * | 6/2008 | Mareachen | 348/14.03 |

FOREIGN PATENT DOCUMENTS

JP      6233289 A      8/1994

OTHER PUBLICATIONS

Avaya Video Telephony Solution, available at http://www.nacr.com/uploadedFiles/Solutions/Avaya&PolycomVideoTelephonySolution.pdf, 2005.
Internet Video Conferencing Station/Phone, available at http://www.euro-teletech.com/videoconferencing.htm, 2006.
Schödl, A., R. Szeliski, D. H. Salesin, and I. Essa, Video textures, Siggraph 2000, Computer Graphics Proceedings, 2000, pp. 489-498, ACM Press / ACM SIGGRAPH / Addison Wesley Longman, K. Akeley, Ed.
VCON Ltd., VCON Desktop Conferencing Systems, Nov. 2004, available at http://www.vcon.com/pdfdoc/eng/manuals/041107_mp46.pdf.

* cited by examiner

*Primary Examiner* — Hemant Patel
(74) *Attorney, Agent, or Firm* — Lyon & Harry LLP; Katrina A. Lyon

(57) ABSTRACT

The present virtual video muting technique seamlessly inserts a virtual video into a live video when the user does not want to reveal his/her actual activity. The virtual video is generated based on real video frames captured earlier, and thus makes the virtual video appear to be real.

19 Claims, 6 Drawing Sheets

INSERTION OF VIRTUAL VIDEO INTO LIVE VIDEO

BACKGROUND

Video conferencing has become more and more popular due to the emergence of readily available high speed Internet and reduced prices for high quality web cameras. Videoconferencing is an important collaboration tool that allows people from different locations to work together while making both verbal and non-verbal cues available to the other party.

There are, however, a number of issues with current video conferencing systems that impact user experiences and collaboration effectiveness. One big issue is privacy. From time to time, a user may want to temporarily leave a video conference to conduct a side conversation with a colleague, to check emails, or to find a document in a drawer. This can be easily done in an audio only conference by turning off (muting) the microphone, which is not noticed by remote participants. However, this is not the case for videoconferencing because a meeting participant's activity is constantly captured by the camera and shown on other people's displays. The lack of privacy sometimes deters meeting participants from using videoconferencing, despite its substantial added value of non-verbal cues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present virtual video muting technique seamlessly inserts a virtual video into live video captured during a video conference when the user does not want to reveal his or her actual activity during a video conference. The virtual video is generated based on real video frames captured earlier, and thus makes the virtual video appear to be real.

In one embodiment, video conferencing video (and associated audio) of a meeting participant is stored as video clips in a video clip database and is also input into the mute/unmute detector. If a mute status is not detected at the mute/unmute detector, the input video is output to other video conferencing participants in the normal manner. However, if a mute status is detected at the mute/unmute detector, then an analyzer and virtual generation module analyzes the input video frame or frames immediately before the mute, and selects a recorded video clip that contains a frame similar to a frame immediately before the mute and starts playing the recorded video clip starting from the similar frame. If unmute is not activated when a prescribed transition event occurs, the analyzer and virtual generation module selects a frame from the currently playing recorded video clip and finds a similar frame in the currently playing or another recorded video clip and transitions to playing that recorded video clip at the similar frame. In this manner, the present virtual video muting technique generates virtual video as long as mute is enabled, thereby allowing the recorded meeting participant to do other things while mute is enabled. The prescribed transition event is defined by a transition pattern that is laid out by the analyzer.

It is noted that while the foregoing limitations in existing techniques for overcoming privacy issues during video conferencing described in the Background section can be resolved by a particular implementation of the virtual video muting technique described, this technique is in no way limited to implementations that just solve any or all of the noted disadvantages. Rather, the present technique has a much wider application as will become evident from the descriptions to follow.

DESCRIPTION OF THE DRAWINGS

The specific features, aspects, and advantages of the claimed subject matter will become better understood with regard to the following description, appended claims, and accompanying drawings where:

DETAILED DESCRIPTION

In the following description, reference is made to the accompanying drawings that form a part hereof, and in which is shown by way of illustration specific embodiments in which the present technique may be practiced. It is understood that other embodiments may be utilized and structural changes may be made without departing from the scope of the present disclosure.

1.0 The Computing Environment.

Before providing a description of embodiments of the present virtual video muting technique, a brief, general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
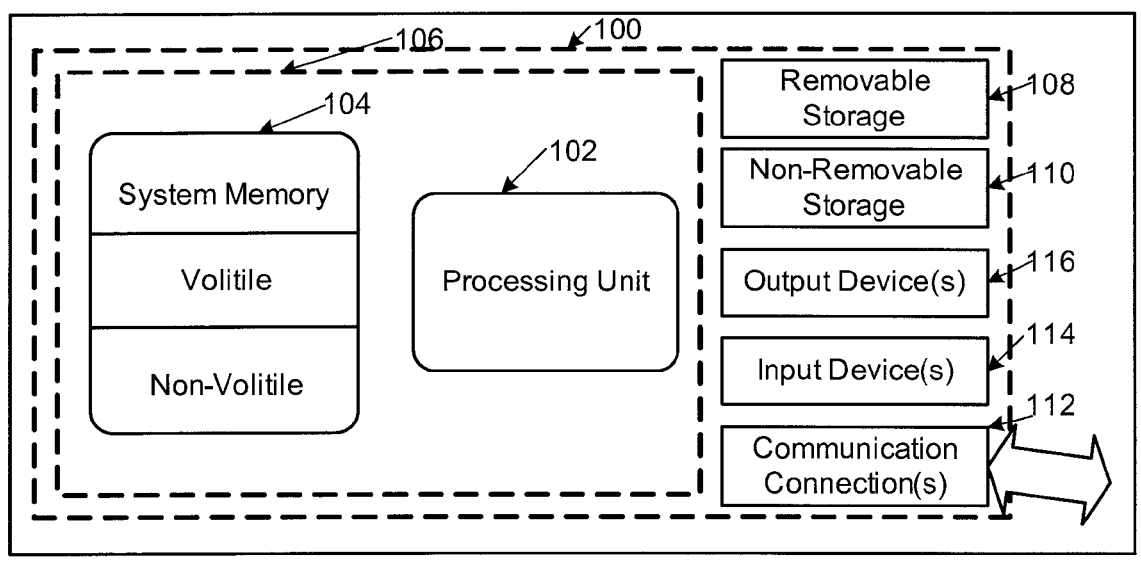
FIG. 1 is a diagram depicting a general purpose computing device constituting an exemplary system for implementing the present virtual video muting technique.

FIG. 1 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices, Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 also has a video camera and a microphone and may also have other input device(s) 114 such as keyboard, mouse, pen, voice input device, touch input device, etc. Output device's) 116 such as a display, speakers, printer, etc. may also be included. All these devices are well known in the art and need not be discussed at length here.

The present technique may be described in the general context of computer-executable instructions, such as program modules, being executed by a computing device. Generally, program modules include routines, programs, objects, components, data structures, and so on that perform particular tasks or implement particular abstract data types. The process may also be practiced in distributed computing environments where tasks are performed by remote processing devices that are linked through a communications network. In a distributed computing environment, program modules may be located in both local and remote computer storage media including memory storage devices.

Figure 2:
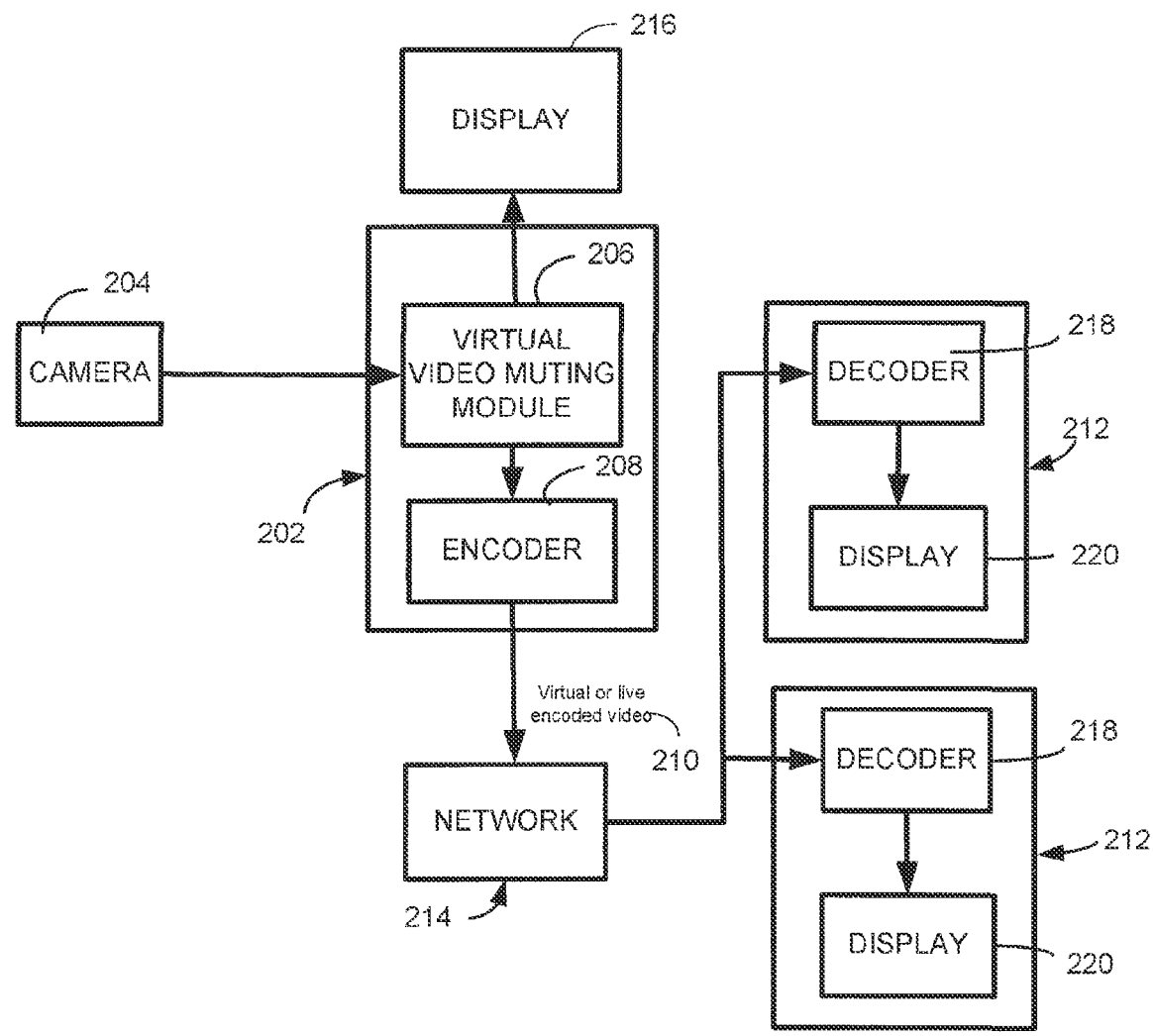
FIG. 2 is a diagram depicting an exemplary video conferencing environment wherein the present virtual video muting technique can be practiced.

The exemplary operating environment having now been discussed, the remaining parts of this description section will be devoted to a description of the program modules embodying the present virtual video muting technique. A more detailed view of an exemplary overall operating environment, such as would be found in a video conferencing application, is shown in FIG. 2.

2.0 Virtual Video Muting Technique.

The present virtual video muting technique replaces the live video used in video conferencing with virtual video when the user activates the mute function, thus protecting the privacy of the user by playing virtual video of the user that makes it appear like he is participating in the meeting, even though he may be doing other things. The virtual video is generated based on real video frames captured prior to the mute, thus making the virtual video appear to be real.

2.1 Exemplary Video Conferencing Environment.

The present virtual video muting technique can be deployed in a typical video conferencing environment. For example, in one embodiment, shown in FIG. 2, video is input into a video conferencing participant's computing device 202 (such as described in the Computing Environment Section) from a camera 204. The computing device also preferably has a display 216. A virtual video muting module 206 creates virtual video 210 when the user mutes the audio corresponding to the video. The virtual video 210 is transmitted to one or more receiving video conference participants 212 over a network 214. If the video is not muted, live video 216 is encoded via the encoding module 208 and transmitted to one or more receiving video conference participants 212 over the network 214. The receiving participants 212 decode the transmitted encoded video (either real or virtual) via a decoder 218 to recover and display the video on their display 220. It should be noted that conventional encoders and decoders can be used to code and decode either the live video or the virtual video.

2.2 Exemplary Virtual Video Muting System

Figure 3:
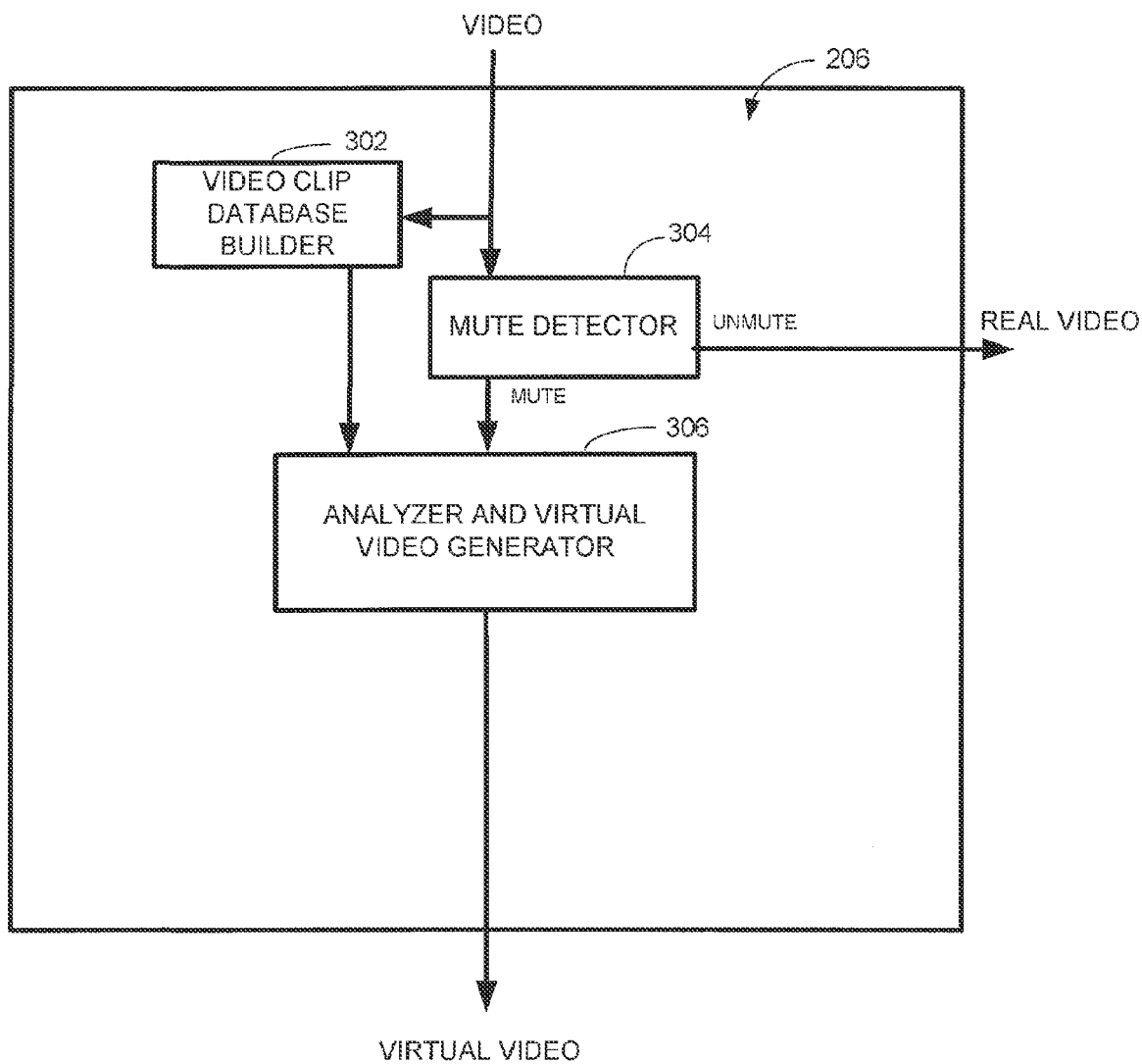
FIG. 3 is a block diagram depicting one embodiment of the virtual video muting system described herein.

Referring to FIG. 3, in one embodiment, the virtual video muting module employs a video clip database builder 302, a mute/unmute detection module 304, and an analyzer and virtual video generation module 306. Video conferencing video (and associated audio) 312 of a meeting participant is input into the video clip database builder 302 and into the mute/unmute detector 304. The input video is processed and recorded in the video clip database 302. If mute is not detected at the mute/unmute detector 304, the input video 312 is output. If mute is detected at the mute/unmute detector 304, then the analyzer and virtual generation module 302 analyzes the input video frame or frames immediately before the mute, and selects a recorded video clip that contains a frame similar to a frame immediately before the mute and starts playing the recorded video clip starting from the similar frame. Frame similarity can be calculated in a number of conventional ways. (For example, by comparing pixel colors in corresponding locations.) If unmute is not activated when a prescribed transition event occurs, the analyzer and virtual generation module 302 selects a frame from the currently playing recorded video clip and finds a similar frame in the currently playing or another recorded video clip and transitions to playing that recorded video clip at the similar frame. In this manner, the present virtual video muting technique generates virtual video as long as mute is enabled, thereby allowing the recorded meeting participant to do other things while mute is enabled. The prescribed transition event is defined by a transition pattern that is laid out by the analyzer. Transition events and patterns will be discussed in greater detail later.

2.3 Exemplary Processes Employing the Video Muting Technique.

Figure 4:
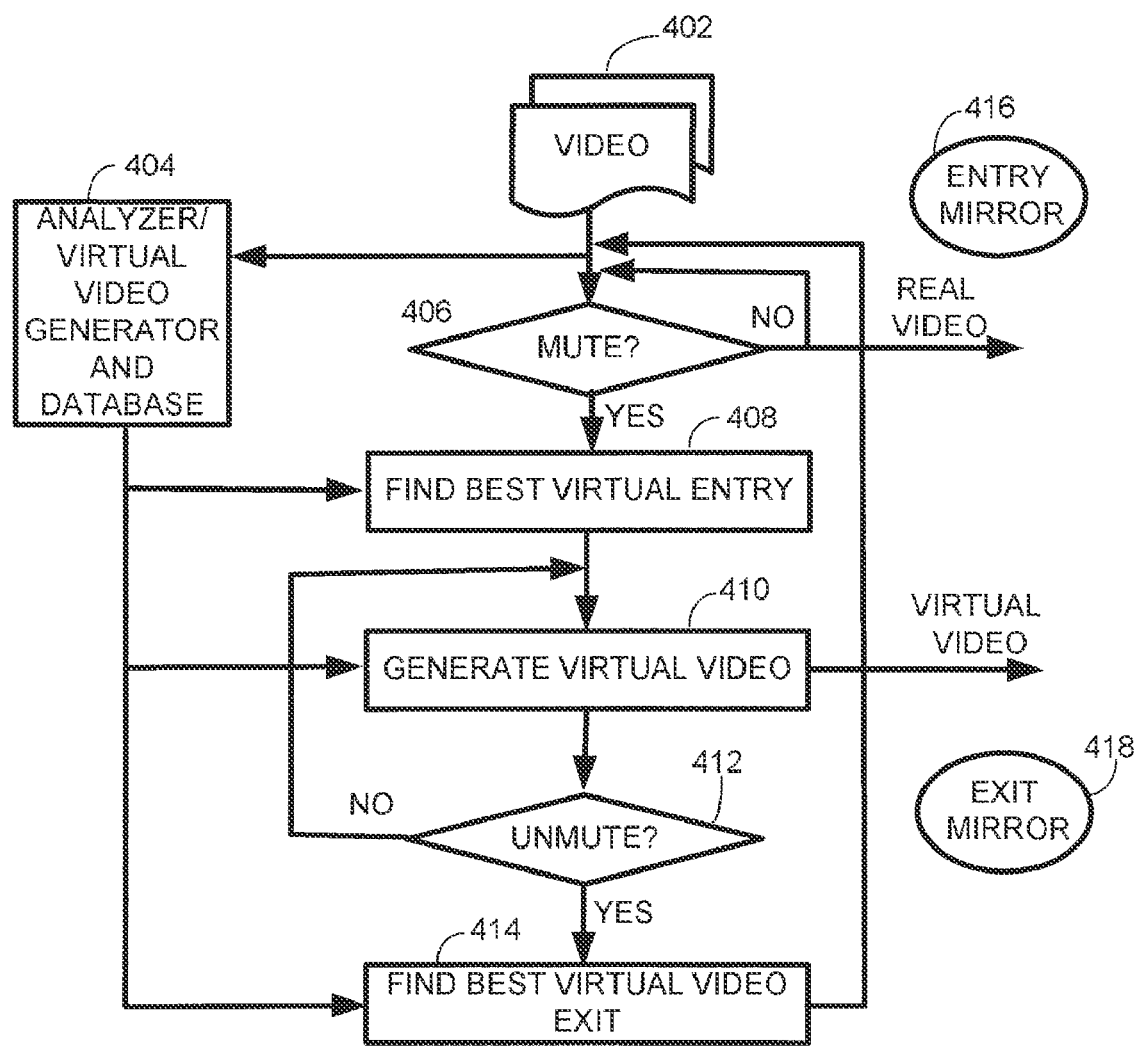
FIG. 4 is a general exemplary flow diagram of a process employed by one embodiment of the present virtual video muting technique.

FIG. 4 depicts a general flow diagram of one embodiment of the present virtual video muting technique disclosed herein. As shown in FIG. 4, the video (and associated audio) of a meeting participant 402 is input into an analyzer/virtual video generator and video clip database 404, where portions of the input video are retained as video clips. Since the retained video clips are used for generating virtual videos for muting, only the video clips in which the meeting participant does not talk are retained. The present virtual video muting technique also checks to see if mute is enabled (box 406). If mute is not enabled the input video is simply output. If mute is enabled, the present virtual video muting technique determines the best entry point to transition to the virtual video generated using portions of the recorded video clips and continues to cycle through the video clips creating virtual video which is output instead of the real input video (box 408, 410). The virtual video is output until mute is disabled (box 412). If mute is disabled, the present virtual video muting technique selects the best virtual video exit 414 and begins outputting the real video input. In determining how a meeting participant should position themselves for the best entries and exits to and from the virtual video an entry mirror 416 and an exit mirror 418 can be employed by displaying them on the meeting participant's display, which will be described in greater detail later.

Figure 5:
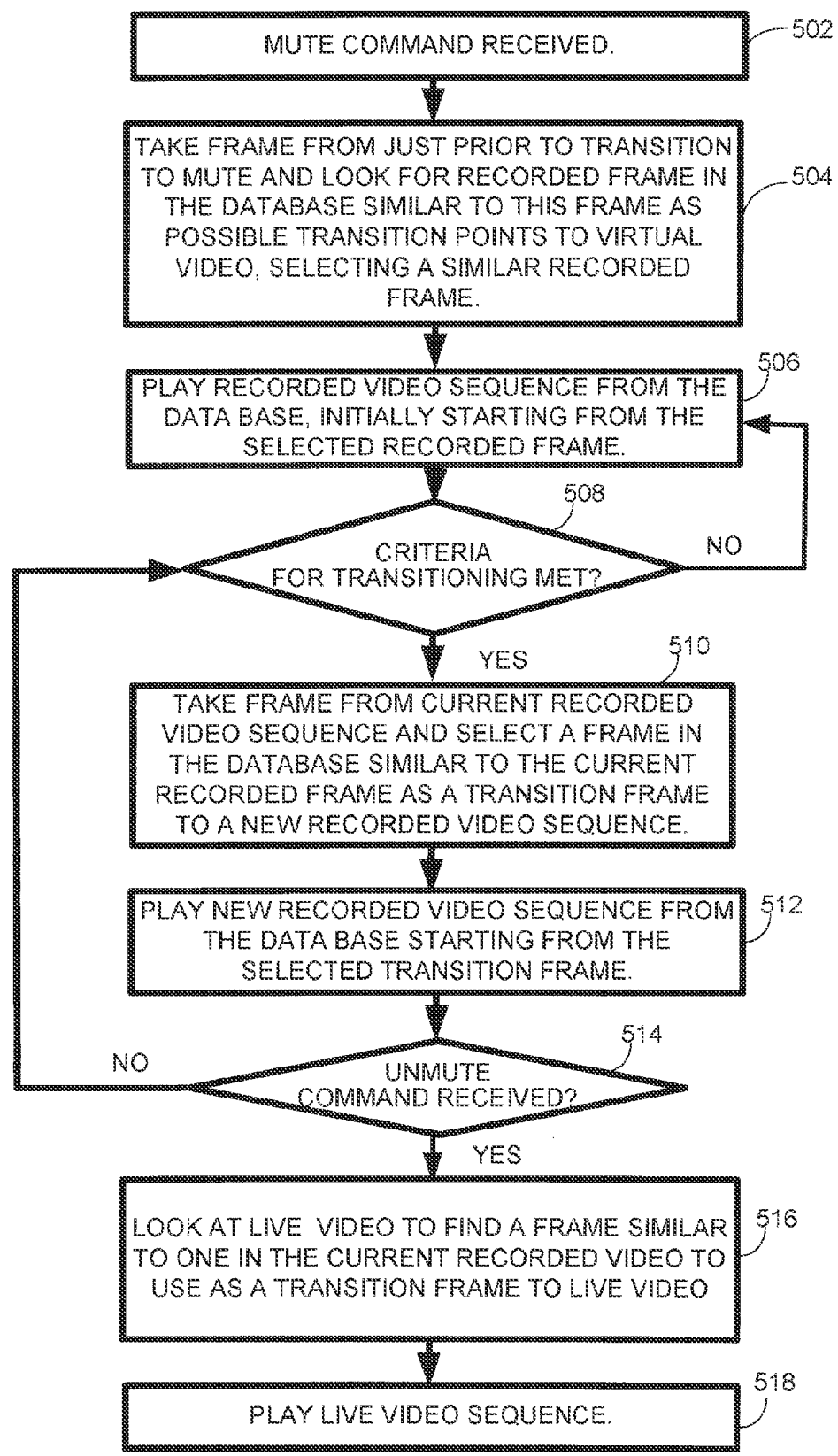
FIG. 5 is another, more detailed, exemplary flow diagram of a process employed by one embodiment of the present virtual video muting technique.

Another, more detailed flow diagram of the transitioning operations of one embodiment of the present virtual video muting technique is shown in FIG. 5. As shown in FIG. 5, box 502, a mute command is received. The present virtual video muting technique takes a frame of the live video from just prior to the transition to mute and looks for a similar recorded frame in a video clip in the video clip database as a possible transition point to the virtual video, selecting a recorded video frame from a video clip similar to a live video frame as a transition to playing the virtual or recorded video clip (box 504). Once the transition frame is selected the present virtual video muting technique plays the recorded video clip, starting at the selected transition frame (box 506) until some prescribed criteria for transitioning to the currently playing or another video clip is met (box 508). At this point the virtual video muting technique takes a frame from the currently playing video clip and selects a frame from the currently playing or another video clip in the database that is similar to this frame as a transition frame to the new video clip (box 510). The present virtual video muting technique then plays the new video clip from the new transition frame, continually transitioning to other video clips in the manner described above, until an unmute command occurs or the video conference ends (boxes 508 through 514). If an unmute command is received (box 514), the present virtual video muting technique then finds a frame in the live video and looks in the video clip database to find a clip similar to the frame in the live video, transitioning to live video using this video clip (boxes 516, 518).

2.4 Details and Alternate Embodiments.

The following sections provide details and variations of the virtual video muting technique described above. It should be noted that besides the methods of generating virtual video described herein, which is then inserted into the live video upon muting, other methods of generating virtual video could also be used in combination with the present virtual video muting technique. For example, the virtual video could also be created using the video-based rendering technique described in U.S. Pat. No. 6,636,220, entitled "Video-based Rendering" and issued on Oct. 21, 2003. Or the virtual video could be generated using the technique described in U.S. Pat. No. 6,600,491, entitled "Video-based Rendering with User-controlled Movement", and issued on Jul. 29, 2003.

2.4.1 Analyzer and Virtual Video Generator.

A key component of the present virtual video muting technique is the analyzer and virtual video generator. The analyzer and virtual video generator builds one or multiple video clips from past real video frames and extracts their structure to facilitate generation of virtual videos when needed. Through similarity analysis of video frames, the extracted video structure contains the information of good transition points between video frames. One crucial task is to find good transitions between video frames so that the technique can generate infinitely long virtual video if necessary, while avoiding repeating the same short video clips (the transitions are discussed in greater detail below). Those frames usually do not contain audio/speech since they are used for muting. The analyzer and virtual video generator employs various transition rules or patterns in transitioning from one video clip to another to build the virtual video. Various transition patterns that can be employed by the virtual video muting technique are discussed below.

2.4.2 Transitions

Figure 6:
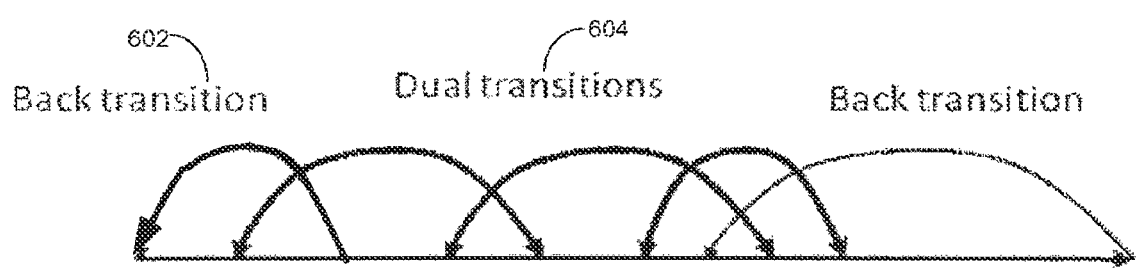
FIG. 6 is a diagram depicting transition patterns employed in the virtual video generation of one embodiment of the present virtual video muting technique.

FIG. 6 shows possible transitions employed when generating virtual video using the recorded video clips in the video clip database. In one embodiment of the present virtual video muting technique, the transitions can be back in time or forward in time 602 or may be dual transitions 604 where the recorded video clip transitions to a clip recorded later in time and then transitions back in time to the next video clip. The following paragraphs describe various transition patterns that can be employed in the virtual video muting technique.

2.4.2.1 Shortest Time to Key Frame Transition Pattern

The selection of transition points between different virtual video clips (e.g., generated from recorded video clips) should preferably be optimized to provide the most realistic and unobservable transitions between video clips. In one embodiment of the present virtual video muting technique, key frames are identified as possible transition frames. Key frames are frames where there is little movement or dynamics in the frame. The amount of movement in the frame can be the sum of the image difference with the preceding frame and that with the succeeding frame. In general, key frames can be used as transition frames for transitioning between video clips, but do not have to be. However, when key frames are used to transition between video clips there is a higher probability of a smooth transition between video clips or between live and virtual video. One embodiment of the present virtual video muting technique employs a transition path that reaches a key frame in the shortest amount of time. This embodiment transitions only using key frames as the transition frames. Transitioning only on relatively static scenes reduces the cost in extracting video structure.

2.4.2.2 Predetermined Transition Pattern

In one embodiment of the present virtual video muting technique a predetermined transition pattern is employed. In this embodiment the technique plays a video clip forward in time until it reaches a backward transition that has not been visited before, unless no forward playing is possible. It then transitions to the new video clip using this path and corresponding transition frame. The next time, while playing the new video clip, when the technique encounters a previously used transition point, it bypasses the used transition point and continues playing the video dip until an unused transition point is encountered.

2.4.2.3 Random Transition Pattern

In another embodiment of the present virtual video muting technique a random transition pattern is used. For example, this embodiment may use a random number generator that generates numbers between 0 and 1. When the number generated is greater than 0.5 the technique employs a forward transition, while if the number is equal to or less than 0.5 the technique employs a back transition.

2.4.2.4 Transition Pattern that Minimizes Predictability

In yet another embodiment, the present virtual video muting technique generates virtual video so a transition pattern is generated that minimizes predictability. In this embodiment, virtual video is generated such that the transition probability is inversely proportional to the number of future jumps/transitions. More specifically, this embodiment picks the transition which will allow a greater number of paths in the future.

2.4.3 Video Clip Database

The video clip data base contains clips or sequences of recorded video of the video conference meeting participant, as well as the information of good transition points between video frames. In these video clips, the meeting participant usually does not talk. These recorded video clips are used by the analyzer and virtual video generator to build new longer virtual video sequences by looping through or transitioning through the recorded video clips in a manner which depicts virtual video of the meeting participant in a natural manner, as discussed above.

2.4.4 Assessing Similarity Between Frames

In determining which frames to use for transitioning between live video and virtual video and when generating virtual video using video clips from the video clip database, the video muting technique can employ conventional techniques for assessing similarity between frames. For example, in one embodiment, the technique compares pixel colors in corresponding locations between previous or future and current frames to ensure the dynamics are similar between these frames. Various other well known methods of assessing frame similarity can also be used, however.

2.4.5 Entry Mirror

To facilitate smooth entry into video muting, one embodiment of the present video muting technique provides an Entry Mirror on the meeting participant's display. The Entry Mirror blends a key frame in the database with the live video, so the user can examine themselves in the mirror relative to this key frame and know how closely he/she is for a perfect entry. The displayed key frame should be close to the current user location to guide a user to be in a position to facilitate smooth entry into the virtual video. The technique may show multiple Entry Mirrors, each corresponding to one key frame, allowing the user to choose which one they want to employ in transitioning to the virtual video.

2.4.6 Exit Mirror.

To guide a user to be in a position to facilitate smooth exit into the virtual video, the virtual video muting technique can provide an Exit Mirror. The Exit Mirror shows a user a future virtual video frame and blends this future virtual video frame with the live video, so that the user knows how closely he or she is for a perfect exit from the virtual video. The virtual video frame should preferably be a frame of the virtual video in the near future (e.g., 3 seconds) to give the user some time to adjust position.

2.4.7 Mute Indicator

One embodiment the present virtual video muting technique provides an indicator on the meeting participant's display when the system is in mute mode. For example, in one embodiment an indicator is lit on the display when the system is in mute mode. Another indicator could be used to guide the meeting participant how close he/she is from a good entry/exit to/from virtual muting.

2.4.8 Instant Replay of Video and/or Audio

In one embodiment of the present virtual video muting technique instant replay functionality of audio and/or video is available after the system has been muted and un-muted.

2.4.9 Text Transcription During Muting.

In one embodiment the present virtual video muting technique text transcription of what was said during the mute is available after the system has been muted and un-muted. The technique does this by employing a conventional speech recognizer that transcribes what meeting participants said into text during the time mute was enabled.

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process inserting virtual video into a live video, comprising using a computer to perform the process actions of:
   inputting video and associated audio of a meeting participant;
   recording portions of the input video as video clips in a video clip database;
   outputting the input video and audio if muting is not desired; and
   if muting is desired,
      taking a frame from the input video just prior to transitioning to mute and selecting a recorded frame in the video clip database similar to the input video frame prior to transitioning to mute as a transition point to transition to virtual video, and
      generating virtual video using the recorded portions of the input video from the video clip database starting from the selected recorded frame until muting is disabled, comprising:
   playing a video clip from the video clip database;
   if the playing video clip meets a prescribed transition point, taking a frame from the playing video clip and finding a similar frame in the currently playing or another video clip in the video clip database; and
   playing the video clip starting at the similar frame.

2. The computer-implemented process of claim 1 further comprising the process actions of:
   encoding the virtual video or the input video; and
   transmitting the virtual video or the input video over the network to one or more other meeting participants.

3. The computer-implemented process of claim 1 further comprising the process action of finding the best point to transition to the virtual video from the input video.

4. The computer-implemented process of claim 3 wherein finding the best point to transition to the virtual video from the input video comprises:
   taking a video frame from the input video just prior to muting and searching for a recorded frame in the video clip database similar to the video frame from the input video just prior to muting as a transition point to play the recorded video clip corresponding to the similar frame, starting from the similar recorded frame.

5. The computer-implemented process of claim 1 wherein similarity between frames is determined by comparing pixel colors in corresponding locations between frames.

6. The computer-implemented process of claim 1 wherein the prescribed transition point is determined by employing a random number generator to determine when to transition to another video clip.

7. The computer-implemented process of claim 1 wherein the prescribed transition point is determined by a prescribed transition pattern that is inversely proportional to the number of possible future transitions to other video clips.

8. The computer-implemented process of claim 1 wherein the prescribed transition point is determined by a predetermined transition pattern.

9. The computer-implemented process of claim 3 further comprising using an entry mirror which blends the input video and the virtual video thereby aiding the meeting participant in positioning themselves at the transition to the virtual video from the input video.

10. The computer-implemented process of claim 3 further comprising using an exit mirror which blends the virtual video and the input video thereby aiding the meeting participant in positioning themselves at the transition to the input video from the virtual video.

11. The computer-implemented process of claim 1 wherein text transcription of the audio of other meeting participants takes place while audio for the input video is muted.

12. The computer-implemented process of claim 1 wherein instant replay functionality of audio or video is available after the audio for the input video has been muted and un-muted.

13. A computer-readable medium having computer-executable instructions for performing the computer-implemented process recited in claim 1.

14. A system for generating virtual video, comprising:
a general purpose computing device;
a computer program comprising program modules executable by the general purpose computing device, wherein the computing device is directed by the program modules of the computer program to,
input video of a video conference meeting participant;
save clips of the input video into a video clip database;
detect whether muting is requested;
select a frame in the video clip database similar to a frame in the input video just prior to detecting the mute request as a transition point;
if muting is requested, starting from the transition point using saved clips of the input video to create virtual video of the video conference meeting participant comprising:
playing a video clip from the video clip database;
if the playing video clip meets a prescribed transition point, taking a frame from the playing video clip and finding a similar frame in the currently playing or another video clip in the video clip database; and
playing the video clip starting at the similar frame.

15. The system of claim 14 wherein the virtual video is transmitted to other video conference meeting participants instead of the input video of the video conference meeting participant.

16. A computer-implemented process for creating virtual video, comprising:
(a) inputting video and associated audio of a meeting participant;
(b) storing portions of the input video in a video clip data base;
(c) if muting is requested, taking a frame just prior to the muting and searching for a in a video clip in the video clip data base that is similar;
(d) playing the video clip in the video clip database, starting from the frame in the video clip that is similar to the frame just prior to the muting until criteria for transition to another video clip is met;
(e) if criteria for transition to another video clip is met, taking a frame from the currently playing video clip and selecting a similar frame in a different video clip;
(f) playing the different video clip from the selected frame until an unmute command is received or criteria for transitioning to another video clip are met;
(g) if criteria for transition to another video clip is met, repeating (e) and (f);
(h) if an unmute command is received, playing the input video.

17. The computer-implemented process of claim 16 wherein a frame is determined to be similar to another frame by comparing the color of pixels in corresponding locations.

18. The computer-implemented process of claim 16 wherein transitions between video clips are conducted based on a predetermined pattern.

19. The computer-implemented process of claim 16 wherein a mute indicator is displayed when associated audio for the input video is muted.

* * * * *